US009006917B2

(12) United States Patent
Versteegh

(10) Patent No.: US 9,006,917 B2
(45) Date of Patent: Apr. 14, 2015

(54) WIND TURBINE

(75) Inventor: Cornelus Versteegh, Hilversum (NL)

(73) Assignee: XEMC VWEC BV, Hilversum (NL)

( * ) Notice: Subject to any disclaimer, the term of this patent is extended or adjusted under 35 U.S.C. 154(b) by 371 days.

(21) Appl. No.: 12/737,365

(22) PCT Filed: Jul. 9, 2009

(86) PCT No.: PCT/EP2009/058722
§ 371 (c)(1),
(2), (4) Date: Jan. 5, 2011

(87) PCT Pub. No.: WO2010/003995
PCT Pub. Date: Jan. 14, 2010

(65) Prior Publication Data
US 2011/0109100 A1    May 12, 2011

(30) Foreign Application Priority Data

Jul. 9, 2008   (EP) .................................... 08160032

(51) Int. Cl.
| | |
|---|---|
| F03D 9/00 | (2006.01) |
| H02P 9/04 | (2006.01) |
| F03D 11/00 | (2006.01) |
| H02K 9/04 | (2006.01) |
| H02K 7/18 | (2006.01) |

(52) U.S. Cl.
CPC ............... *F03D 11/00* (2013.01); *F03D 9/002* (2013.01); *F05B 2220/7066* (2013.01); *F05B 2220/7068* (2013.01); *F05B 2260/20* (2013.01); *H02K 9/04* (2013.01); *Y02E 10/722* (2013.01); *Y02E 10/725* (2013.01); *Y02E 10/726* (2013.01); *H02K 7/1838* (2013.01)

(58) Field of Classification Search
USPC ........................................ 290/44, 55; 415/4.3
See application file for complete search history.

(56) References Cited

U.S. PATENT DOCUMENTS

| | | | |
|---|---|---|---|
| 6,439,832 B1* | 8/2002 | Siegfriedsen .................. 415/4.3 |
| 6,774,504 B1 | 8/2004 | Lagerwey | |
| 7,365,447 B2* | 4/2008 | Yoshida .......................... 290/55 |
| 7,550,863 B2* | 6/2009 | Versteegh ....................... 290/44 |
| 7,821,164 B2* | 10/2010 | Laskaris et al. .................. 310/52 |
| 8,021,121 B2* | 9/2011 | Mikkelsen et al. ........ 416/245 R |
| 8,047,774 B2* | 11/2011 | Bagepalli ...................... 415/176 |
| 8,203,229 B2* | 6/2012 | Stone .............................. 290/55 |

(Continued)

FOREIGN PATENT DOCUMENTS

| | | |
|---|---|---|
| DE | 199 19 040 A1 | 9/2000 |
| EP | 1 257 037 A1 | 11/2002 |
| WO | WO 2006/032515 A1 | 3/2006 |

*Primary Examiner* — Pedro J Cuevas
(74) *Attorney, Agent, or Firm* — Amster, Rothstein & Ebenstein LLP

(57) ABSTRACT

The invention concerns a wind turbine comprising a tower (23), on top of the tower a nacelle (29) supported by a vertical drum (24) enclosing an upper room (52), a rotor rotating with a more or less horizontal shaft (32) supported in bearings (17, 31) mounted in the nacelle with at one end a hub (3) with turbine blades (5) and at the other end a generator rotor (27) rotating with a narrow gap (44) inside a generator stator (11), the generator stator being mounted with its outer surface against an outer wall (9) of the nacelle (29), which outer wall might have cooling strips (37) or similar on its outer surface. In accordance with the invention the wind turbine comprises a first cooling system for cooling the part (19) of the outer surface of the generator stator (11) and/or of the outer wall (9) of the nacelle (29) located in the upper room (52).

11 Claims, 4 Drawing Sheets

(56) References Cited

U.S. PATENT DOCUMENTS

Figure 1:
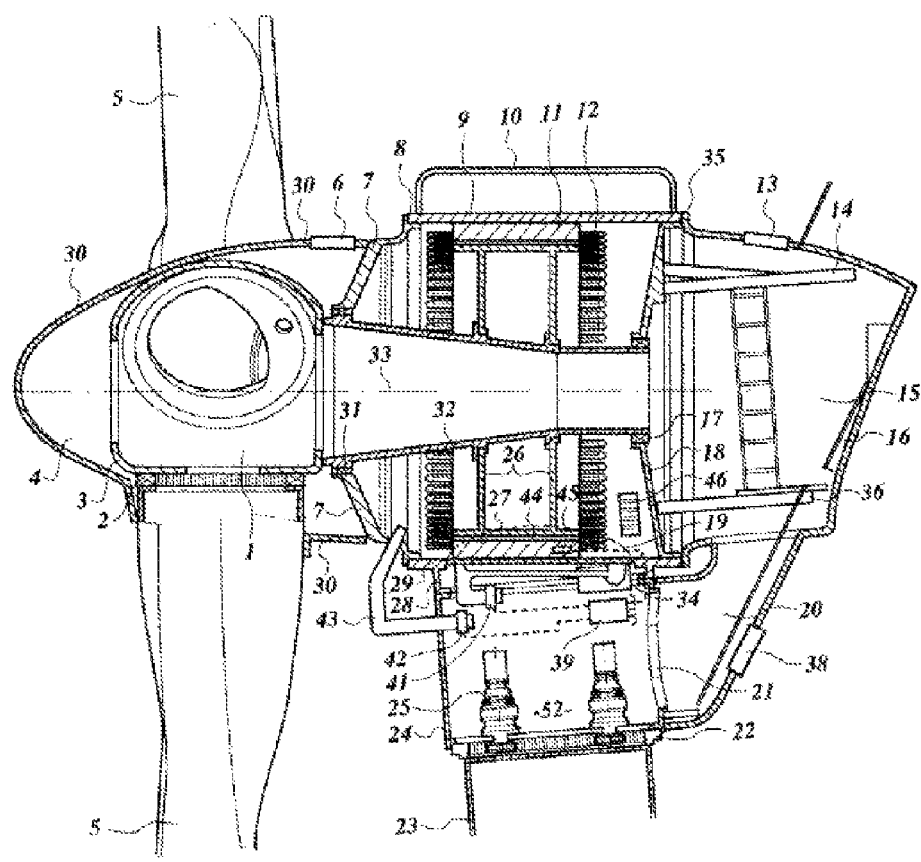

| | | | |
|---|---|---|---|
| 8,564,153 B2* | 10/2013 | Sonajalg et al. | 290/55 |
| 8,585,358 B2* | 11/2013 | Matsuo et al. | 415/176 |
| 8,632,303 B2* | 1/2014 | Akashi et al. | 415/176 |
| 2001/0035651 A1 | 11/2001 | Umemoto et al. | |
| 2003/0011397 A1* | 1/2003 | Briendl et al. | 324/772 |
| 2008/0197633 A1* | 8/2008 | Laskaris et al. | 290/44 |
| 2008/0197638 A1 | 8/2008 | Wobben | |
| 2008/0272604 A1* | 11/2008 | Versteegh | 290/55 |
| 2010/0061853 A1* | 3/2010 | Bagepalli | 416/95 |
| 2010/0314873 A1* | 12/2010 | Stone | 290/44 |
| 2011/0272949 A1* | 11/2011 | Matsuo et al. | 290/55 |
| 2013/0076174 A1* | 3/2013 | Wibben et al. | 310/64 |
| 2013/0249341 A1* | 9/2013 | Airoldi et al. | 310/156.27 |
| 2014/0100113 A1* | 4/2014 | Stautner et al. | 505/163 |
| 2014/0100114 A1* | 4/2014 | Stautner et al. | 505/163 |

\* cited by examiner

WIND TURBINE

CROSS-REFERENCE TO RELATED APPLICATIONS

This application is a U.S. national stage entry under 35 U.S.C. §371 of PCT International Patent Application No. PCT/EP2009/058722, filed Jul. 9, 2009, and claims priority to European Patent Application No. 08160032.2, filed Jul. 9, 2008, the contents of which are incorporated herein by reference in their entirety.

The invention concerns a wind turbine in accordance with the preamble of claim 1. In the known wind turbine the generator stator has good heat conducting capabilities and the heat generated in the generator stator is dissipated through the outer wall of the nacelle to the surrounding air. However it has been found that the heat generated in the generator stator immediately above the upper room is more difficult to remove and the temperature in the generator stator is higher in that area. This leads to unequal deformations in the generator stator so that the narrow gap between the generator stator and the generator rotor is not equal over the whole circumference and might even approach zero, which is undesirable.

In order to overcome this disadvantage the wind turbine is according to claim 1. In this way the generated heat conducts directly along the shortest path towards the outer surface of the generator stator and/or the outer wall of the nacelle and there is no temperature difference in the circumference of the generator stator so that the gap between the generator stator and the generator rotor is more or less constant.

In accordance with an embodiment the wind turbine is according to claim 2. By making use of sensors in the generator stator the first cooling system can adapt the cooling to different situations such as changes in the intensity or the direction of solar radiation on the nacelle.

In accordance with an embodiment the wind turbine is according to claim 3. In this way the cooling can be adapted more accurately to the temperature distribution over the circumference of the generator stator.

In accordance with an embodiment the wind turbine is according to claim 4. By cooling the stator with circulating air a robust and dependable cooling system is available.

In accordance with an embodiment the wind turbine is according to claim 5. This makes more efficient cooling of the stator possible.

In accordance with an embodiment the wind turbine is according to claim 6. In this way damage due to deformation of the generator stator as a result of temperature differences is prevented.

In accordance with an embodiment the wind turbine is according to claim 7. In this way the generator stator is also cooled from its inside surface.

In accordance with an embodiment the wind turbine is according to claim 8. In the vertical drum the air is reasonable clean so that the air that is guided through the narrow gap in the generator is clean and contamination of the generator is prevented.

In accordance with an embodiment the wind turbine is according to claim 9. The ambient air near the top of the tower is several degrees cooler than at the bottom of the tower and at the lee side of the vertical drum the air inflow into the vertical drum is less subject to wind gusts and rain. In this way the air let in into the vertical drum is most advantageous for cooling the generator stator.

Figure 2:
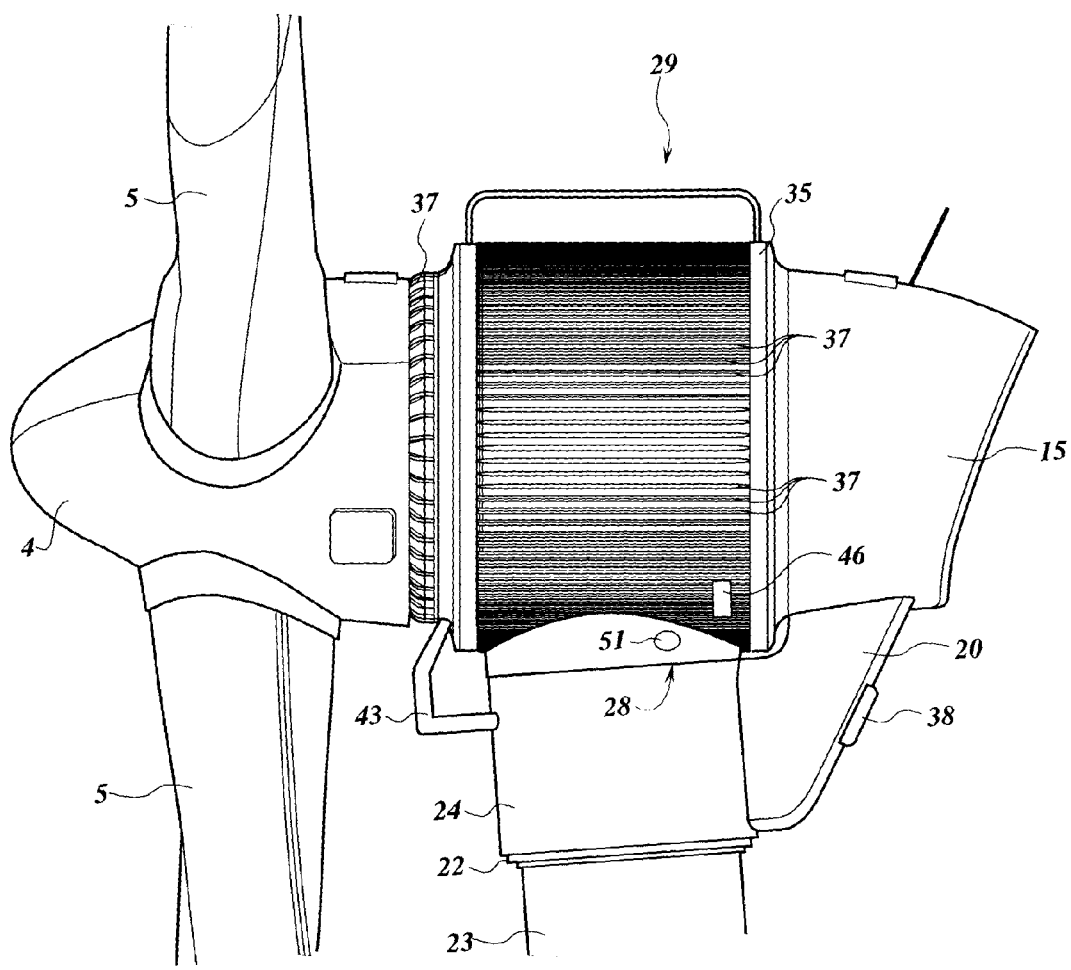
Figure 3:
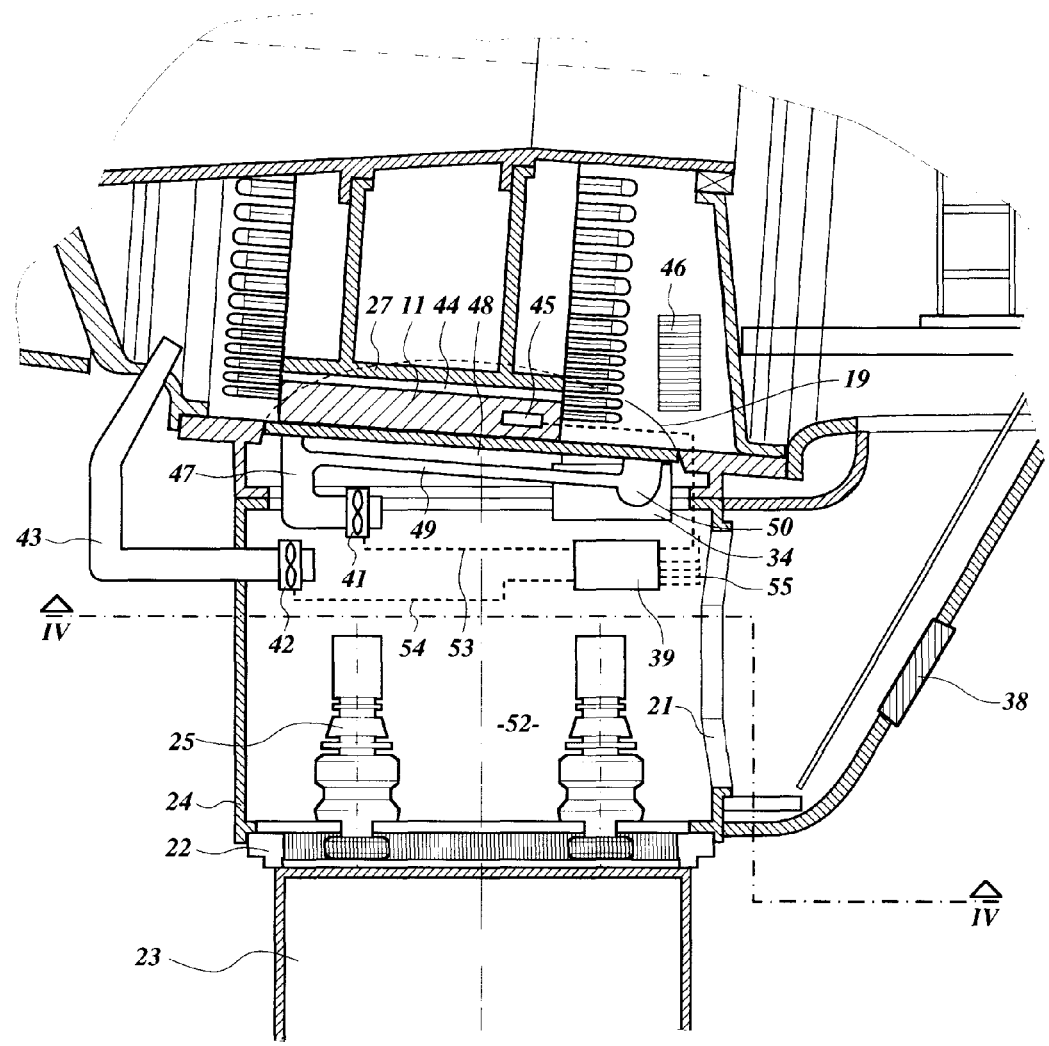
Figure 4:
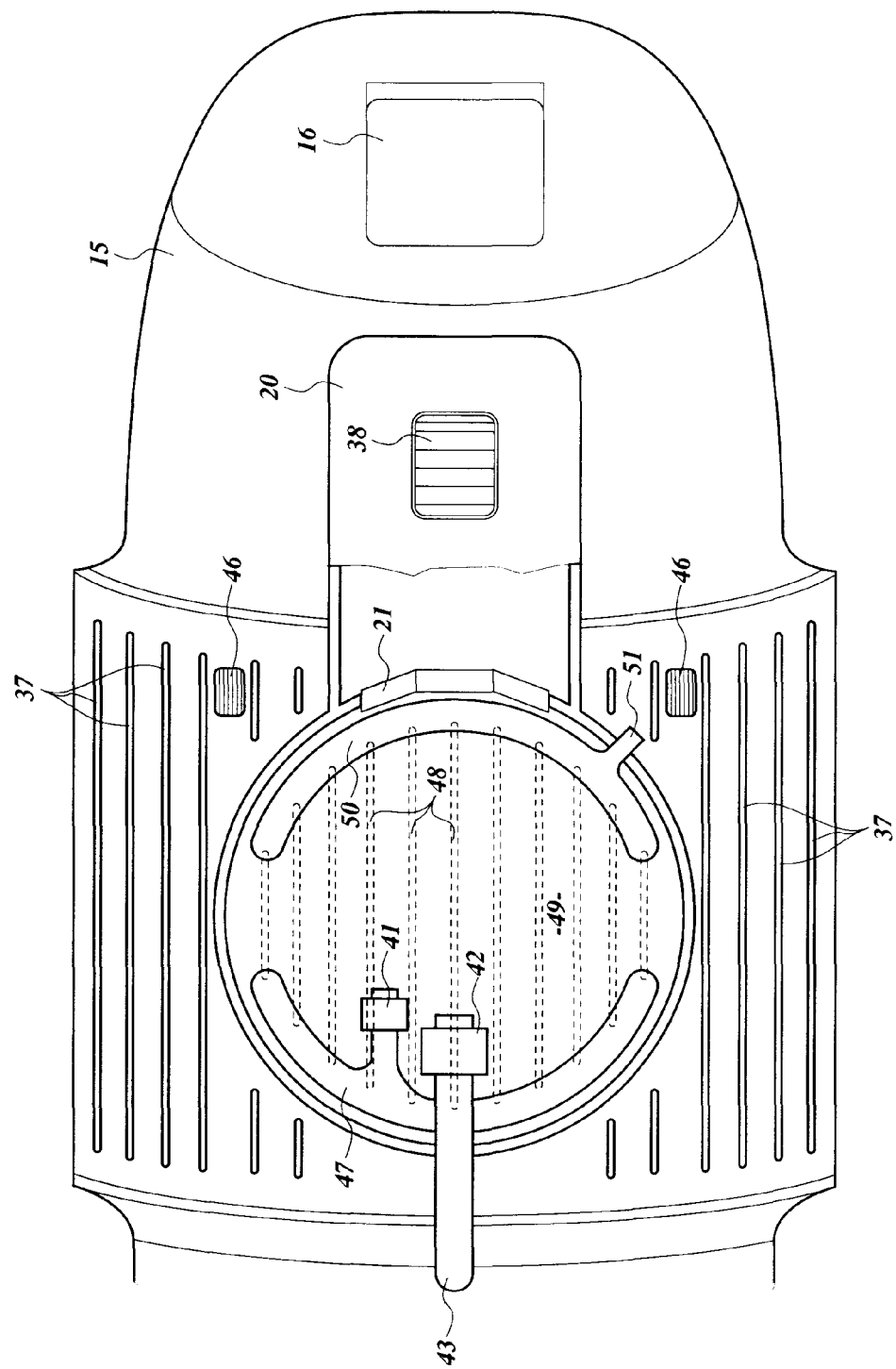

Hereafter the invention is explained in more detail by describing an embodiment of a wind turbine with the aid of a drawing in which FIG. 1 shows a schematic section of the top of a tower with a nacelle of a wind turbine, FIG. 2 shows a side view of the nacelle of the wind turbine, FIG. 3 shows a detail of the section of FIG. 1, and FIG. 4 shows section IV-IV of FIG. 3.

A yaw bearing 22 is mounted on a tower 23. In the shown embodiment the tower 23 is a cylindrical or slightly conical pipe which is mounted on a foundation. The tower 23 can have different shapes such as a truss. The yaw bearing 22 supports a cylindrical shell 24 which is coupled via a connecting flange 28 to an outer shell 9 of a nacelle 29. The cylindrical shell 24 forms an upper room 52 that has a height of approximately 2 meter, so that above the yaw bearing 22 there is sufficient room for an operator to stand. In the upper room 52 of the cylindrical shell 24 a yaw drive 25 is mounted on gear teeth that are part of the yaw bearing 22 for rotating the nacelle 29 so that a rotation axis 33 of a hub 3 with blades 5 can be directed in the direction of the wind that drives the blades 5 of the wind turbine. The cylindrical shell 24 and/or the connecting flange 28 have a diameter that is more than 50% or approximately 60% of the diameter of the outer shell 9, so that the cylindrical shell 24 and/or the connecting flange 28 stiffen the outer shell 9 considerably and ensure its roundness.

The outer shell 9 together with the connecting flange 28 can be made in one piece from cast metal, such as cast steel. It can be advantageous to cast this piece in such a way that inside the connecting flange 28 there is a partial or full opening instead of the cylindrical wall of the outer shell 9. In that case preferably a plate 19 is welded or mounted in this opening to make a separation between the upper room 52 under the nacelle 29 and the inside of the generator. In another embodiment instead of the connecting flange 28 and the outer shell 9 being made from a casting they can be welded from plate or pipe material.

The outer shell 9 forms the outside of the nacelle 29 and the generator is immediately at the inside of the outer shell 9 as the outer shell 9 is mounted around stator plates 11 with stator windings 12. As a result of generating electricity the generator will also generate heat in the stator plates 11 and/or the stator windings 12, which heat has to be removed. For this reason the stator plates 11 are immediately against the outer shell 9 and preferably the outer shell 9 is on its outside provided with cooling fins 37 which are cooled by the ambient air. Other measures are discussed later.

The front end of the outer shell 9 is connected with a front flange connection 8 to a front cover 7. The front cover 7 may have on its outside surface cooling fins 37. A front bearing 31 is mounted in the front cover 7. Preferably the front cover 7 is more or less conical, so that the axial forces from the blades 5 are directed in a direct way with little deformation to the outer shell 9 and from there via the vertical connection flange 28 to the cylindrical wall 24 and the yaw bearing 22. The hind end of the outer shell 9 is connected by a hind flange connection 35 to a hind cover 18. A hind bearing 17 is mounted in the hind cover 18. A hollow shaft 32 with the rotation axis 33 is mounted in the front bearing 31 and the hind bearing 17. The generator is designed such that its centre of gravity, which is mainly determined by the weight of the stator windings 12, is within the outer circumference of the yaw bearing 22. Preferably the front bearing 31 and the hind bearing 17 have a considerable distance, for instance at least the diameter of the yaw bearing 22. The front bearing 31 is preferably in front of the circumference of the yaw bearing 22 and if possible the hind bearing 17 is on the other side of the outer circumference of the yaw bearing 22.

Two flanges 26 connect a rotor 27 to the hollow shaft 32. The rotor 27 rotates with the hollow shaft 32 and the blades 5 and has on its outside circumference permanent magnets (not shown) that interact with the stator windings 12 to generate electrical power in cables of the stator windings 12. The cables of the stator windings 12 are guided through an opening (not shown) in the bottom of the outer shell 9 or in the plate 19 to a connection box 34 which is located in the cylindrical shell 24. A cable connecting the connection box 34 with a converter for converting the generated Alternating Current into Direct Current or connecting it to other connections hangs from the connection box 34 through an opening in the yaw bearing 22 so that the nacelle 29 can rotate freely.

At the front end of the outer shell 9 the hollow hub 3 is coupled to the hollow shaft 32. At the hind end of the outer shell 9 the nacelle 29 has a control room 15 of which the outside extends more or less in line with the outside surface of the outer shell 9. The control room 15 is accessible from the upper room 52 via an opening 21 in the wall of the cylindrical shell 24 and a passage 20 which connects upper room 52 and an opening 36 in the floor of the control room 15. The control room 15 has a hoist rail 14 on which a hoist (not shown) can slide. The wall that faces away from the generator has a hatch 16, which is inclined and partly under the hoist rail 14 so that parts can be lowered down from or hoisted up into the control room 15 through the hatch 16.

The hollow hub 3 has a hub room 1 which is accessible from the control room 15 through the hollow shaft 32. The blades 5 are attached to the hub 3 with a blade bearing 2 and there is a blade drive (not shown) for changing the pitch of the blades. For reducing the flow resistance in the wind the hub 3 is encompassed by a cover 30 which has a nose 4. An operator can access the hub room 1 through the hollow shaft 32 in an easy way for maintenance of the inside of the blades 5 and the blade drives that are accessible from the hub room 1. Thereby the operator reaches the hub room 1 without crossing the inside of the generator and does not get near the high tension wiring of the stator windings 12. Also he keeps free of the cables that hang down from the connection box 34 in the tower 23. For maintenance of the outside of the hub 3 and the roots of the blades 5 the hub 3 can be accessed via a hatch 13 in the roof of the control room 15 and a path formed by a railing 10 over the top surface of the outer shell 9. A hatch 6 in a protective cover 30 makes access of the inside of the cover 30 and the outside of the hub 3 and the roots of the blades 5 possible.

For removing the heat generated in the generator the outer shell 9 is cooled by ambient air that flows along its outer surface and if available the cooling fins 37 that are mounted on the outer surface of the outer shell 9. The outer shell 9 is mounted on the connecting flange 28 to connect the nacelle 29 to the tower 23 and in the upper room 52 enclosed by the connecting flange 28 there is no ambient air that removes excess heat. In order to prevent that too much heat accumulates in the stator plates 11 and windings 12 of generator in the area above the tower 23 the part of the outer shell 9 enclosed by the connecting flange 28 is provided with a separate cooling system. In the shown embodiment in the upper room 52 a cooling air channel 49 is mounted against the outer surface of plate 19, which plate 19 is in direct contact with the stator plates 11 in a way that is similar to the contact between the outer shell 9 and the stator plates 11. The cooling air channel 49 has an inlet air spreading nozzle 47 for connecting the cooling air channel 49 to a first ventilator 41 and an outlet air connecting nozzle 50 for connecting the cooling air channel 49 to an air outlet 51 in the outer shell 9. The first ventilator 41 blows air from the upper room 52 along the outer surface of plate 19, on which cooling fins 48 can be mounted, and the heated air is blown into the surrounding air through the air outlet 51. Air from the surroundings can enter the upper room 52 through an air inlet opening 38 which is at the lee side of the nacelle 29 so that cool and relative dry air is sucked into the upper room 52.

The first ventilator 41 can be switched on dependence of the wind speed along the outer surface of the outer shell 9 and its ventilating capacity might be made dependable of the wind speed as well. A more accurate way of controlling the first ventilator 41 is by measuring the temperature of the stator plates 11 or the stator windings 12 over the circumference with sensors 45. In the stator plates 11 or stator windings 12 six or more sensors 45 are mounted, sensor lines 55 connect each sensor 45 to a temperature control system 39. A control line 53 connects the temperature control system 39 to the first ventilator 41. If the control system 39 detects that one or more of the sensors 45 indicates a temperature that is different from the other sensors 45 this might indicate that the heat generated in the generator is removed evenly around the circumference and that the cooling of the area cooled by the cooling air channel 49 must be adjusted, for instance by changing the circulation capacity of the first ventilator 41.

In the embodiment described the cooling air channel 49 circulates air over the whole surface of the plate 19 that is exposed to the upper room. In a different embodiment the air channel 49 can be divided in two or more channels so that different areas of the plate 19 can be cooled at different cooling capacities. This makes it possible that either the left side or the right side of the plate 19 is cooled with a higher capacity in order to compensate a higher temperature at one side of the nacelle 29 as compared to the other side as a result for instance of sun radiation. In the described embodiments the cooling of the plate 19 takes place by ventilating air, however in a different embodiment other ways of cooling the plate 19 and/or the stator plates 11 located above the upper room 52 can be in other ways such as with cooling liquid or any other way.

A second ventilator 42 can circulate air from the upper room 52 through an air duct 43 to the front side of the generator housing. In the generator housing the air flows through a gap 44 between the rotor 27 and the stator plates 11 to an air outlet 46 and so cools the stator plates 11. In case the sensors 45 detect a too high temperature in the stator plates 11 or the stator windings 12 the second ventilator 42, that is connected to the temperature control system 39 by a control line 54, is switched on or its circulation capacity is increased. In this way the stator plates 11 are cooled from the outside by the ambient air and the air circulated by the first ventilator 41 and from the inside by the air circulated by the second ventilator 42. In the shown embodiment the air duct 43 is shown partly outside the cylindrical wall 24 and the air duct 43 enters the nacelle 29 through the front cover 7. For the skilled man it will be clear that the air duct 43 can be located at many other locations and may for instance enter the front area of the generator through the plate 19 or through the outer shell 9.

The sensors 45, or at least two of them, can be used in a safety protection system that guards the overheating of the generator. In that case the temperature control system 39 can detect overheating of the generator by monitoring the sensors 45 and giving a warning when one or more sensors 45 indicates a value that differs considerably from values given by one or more other sensors 45.

The invention claimed is:

1. Wind turbine comprising a tower (23), on top of the tower a nacelle (29) supported by a vertical drum (24) enclosing an upper room (52), a rotor rotating with a more or less horizontal shaft (32) supported in bearings (17,31) mounted in the nacelle with at one end a hub (3) with turbine blades (5) and at the other end a generator rotor (27) rotating with a narrow gap (44) inside a generator stator (11), the generator stator being mounted with its outer circumferential surface against an outer wall (9) of the nacelle, the generator stator being positioned on top of the vertical drum with a central axis of the tower crossing the generator stator, the vertical drum having a top edge enclosing part of the outer surface of the generator stator and/or of the outer wall of the nacelle mounted against the outer surface of the generator stator, wherein the wind turbine comprises a first cooling system for cooling said part (19) of the outer surface of the generator stator (11) and/or of the outer wall (9) of the nacelle (29), said cooling system being located in the upper room (52) and comprising one or more channels to guide a cooling medium along the part of the outer surface of the generator stator and/or of the outer wall of the nacelle enclosed by the top edge of the vertical drum.

2. Wind turbine in accordance with claim 1 wherein the first cooling system includes a control system (39) connected to a number of sensors (45) in the generator stator (11).

3. Wind turbine in accordance with claim 1 wherein the first cooling system includes a control system (39) connected to a number of sensors (45) in the generator stator (11) which control system can set different cooling capacities for different parts of the outer surface (19) and/or outer wall (9) located in the upper room (52).

4. Wind turbine in accordance with claim 1, wherein the first cooling system includes a control system (39) connected to a number of sensors (45) in the generator stator (11) which control system is coupled to a first ventilator (41) circulating air over the outer surface of the generator stator and/or outer wall of the nacelle (29) located in the upper room (52).

5. Wind turbine in accordance with claim 1, wherein the outer surface of the generator stator (11) and/or outer wall (9) of the nacelle (29) located in the upper room (52) is provided with cooling ribs (49).

6. Wind turbine in accordance with claim 4, wherein the wind turbine has an over-all safety protection system and at least two of the sensors (45) of the control system (39) are part of the safety protection system.

7. Wind turbine in accordance with claim 1, wherein the wind turbine comprises an air circulation channel (43) with a second ventilator (42) for circulating cooling air through the narrow gap (44) between the generator stator (11) and the generator rotor (27).

8. Wind turbine in accordance with claim 7, wherein the air circulation channel (43) leads air from the inside of the vertical drum (24) to the narrow gap (44).

9. Wind turbine in accordance with claim 1, wherein the upper room (52) has a cooling air inlet (38) at the side opposite the hub (3).

10. Wind turbine in accordance with claim 2, wherein the number of sensors is six or more.

11. Wind turbine in accordance with claim 1, wherein the upper room (52) contains an air circulation channel (43) for cooling housing for the generator and a channel (47) for cooling inner parts of the generator stator (11).

* * * * *